US011605474B2

(12) United States Patent
Petrov et al.

(10) Patent No.: US 11,605,474 B2
(45) Date of Patent: Mar. 14, 2023

(54) CONTAINER AND METHOD FOR STORING SPENT NUCLEAR FUEL

(71) Applicant: NFC LOGISTICS, JOINT-STOCK COMPANY (NFCL JSC), Moscow (RU)

(72) Inventors: Evgenii Dmitrievich Petrov, Dimitrovgrad (RU); Andrei Valer'evich Sokolov, Dimitrovgrad (RU); Andrei Viktorovich Vildeev, Dimitrovgrad (RU); Andrei Mikhailovich Mokeichev, Dimitrovgrad (RU)

(73) Assignee: NFC LOGISTICS, JOINT-STOCK COMPANY (NFCL JSC), Moscow (RU)

( * ) Notice: Subject to any disclaimer, the term of this patent is extended or adjusted under 35 U.S.C. 154(b) by 0 days.

(21) Appl. No.: 17/256,583

(22) PCT Filed: Dec. 29, 2018

(86) PCT No.: PCT/RU2018/000911
§ 371 (c)(1),
(2) Date: Dec. 28, 2020

(87) PCT Pub. No.: WO2020/139123
PCT Pub. Date: Jul. 2, 2020

(65) Prior Publication Data
US 2021/0319924 A1    Oct. 14, 2021

(30) Foreign Application Priority Data

Dec. 28, 2018 (RU) ................. 2018147149

(51) Int. Cl.
*G21F 5/12*  (2006.01)
*G21F 5/02*  (2006.01)
(Continued)

(52) U.S. Cl.
CPC .............. *G21F 5/125* (2019.01); *G21F 5/005* (2013.01); *G21F 5/02* (2013.01); *G21F 5/12* (2013.01); *G21C 17/07* (2013.01); *G21F 5/008* (2013.01)

(58) Field of Classification Search
CPC . G21F 5/008; G21F 5/125; G21F 5/00; G21F 5/12; G21F 5/005; G21F 5/06;
(Continued)

(56) References Cited

U.S. PATENT DOCUMENTS 4,426,350 A * 1/1984 Zegar ................. G21C 1/09
376/463
4,445,042 A * 4/1984 Baatz ................. G21F 5/12
976/DIG. 349

(Continued)

*Primary Examiner* — Darlene M Ritchie
(74) *Attorney, Agent, or Firm* — J. Miguel Hernandez; James R. Gourley; Carstens, Allen & Gourley, LLP

(57) ABSTRACT

Method for long-term dry storage of spent nuclear fuel includes injecting the inert gas into a cavity formed in a cask between inner and outer lids under pressure greater than the pressure of the inert gas in the inner cavity of the cask in which the spent nuclear fuel is located. The cask contains a body with a spent nuclear fuel container placed in it, tight inner and outer lids forming a cavity into which the inert gas is pumped under pressure greater than the pressure in the inner cavity of the cask. The outer lid comprises a labyrinth hole closed with a flange and sealed with a gasket. The flange comprises an angle valve, to which at least two pressure sensors are connected. The angle valve and sensors are covered with a protective cover during long-term storage. The gasket is installed in an annular groove of the lower flange.

9 Claims, 1 Drawing Sheet

Figure 1:
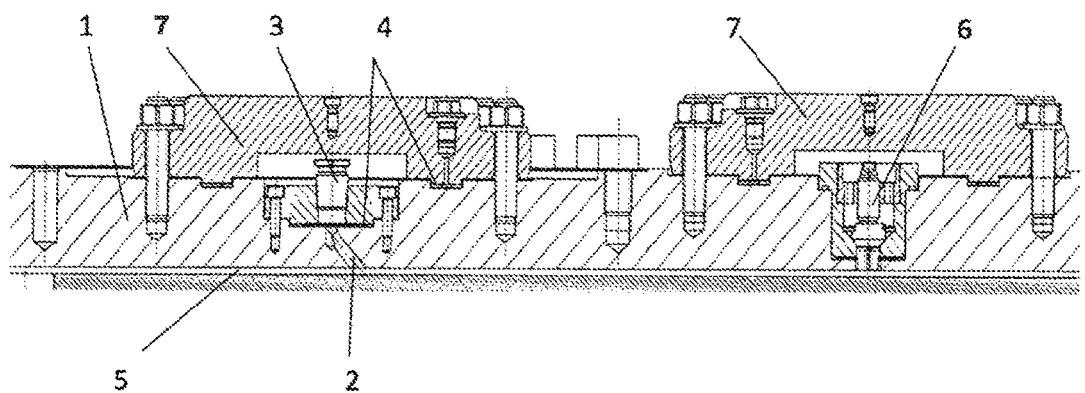

(51) Int. Cl.
*G21F 5/005* (2006.01)
*G21F 5/008* (2006.01)
*G21C 17/07* (2006.01)

(58) Field of Classification Search
CPC ..... G21F 5/02; G21F 5/04; G21F 9/36; G21F 9/02; G21C 19/06; G21C 17/07
USPC ........................................................ 376/272
See application file for complete search history.

(56) References Cited

U.S. PATENT DOCUMENTS

| | | | | |
|---|---|---|---|---|
| 4,495,139 A | * | 1/1985 | Janberg | G21F 5/12 |
| | | | | 376/250 |
| 4,983,352 A | * | 1/1991 | Efferding | G21F 5/012 |
| | | | | 73/49.3 |
| 5,089,214 A | * | 2/1992 | Graham | G21F 5/12 |
| | | | | 376/250 |
| 2014/0221721 A1 | * | 8/2014 | Bermudez | G21F 9/08 |
| | | | | 588/16 |

* cited by examiner

TRANSPORT

LONG-TERM STORAGE

LONG-TERM STORAGE

CONTAINER AND METHOD FOR STORING SPENT NUCLEAR FUEL

CROSS-REFERENCE TO RELATED DISCLOSURE

This application is a U.S. National Stage of International Application No. PCT/RU2018/000911, filed on Dec. 29, 2018, and published as WO 2020/139123 on Jul. 2, 2020, titled "Container and Method for Storing Spent Nuclear Fuel," which claims priority to RU 2018147149 filed on Dec. 28, 2018. Each application, publication, and patent listed in this paragraph are hereby incorporated by reference in their entireties.

The invention relates to nuclear engineering, namely to methods and casks for long-term dry storage of spent nuclear fuel, in particular, to casks for dry storage of spent nuclear fuel of VVER-1000/1200 nuclear reactors.

In connection with the increasing distribution of nuclear power plants, the necessity for developing reliable and safe methods to store spent nuclear fuel is increasing, which should ensure safe storage for a significant period of time, 60 years or more.

There are known methods for storing spent nuclear fuel in spent fuel pools (for example, patent RU 2403633, G21C 19/06, G21F 9/36, 2010, US application for invention US 2009069621, G21F 5/005, 2009, patent RU 2407083, G21C 19/22, 2010).

However, when the outer walls of the cask come into contact with water in the spent fuel pools, over time, under the influence of corrosion processes, the cask loses its tightness and the water is subject to radioactive contamination.

This problem does not occur in case of "dry" storage of spent nuclear fuel, when it is placed in sealed canisters, which are placed in an air-cooled "dry" storage.

A method for storing spent nuclear fuel in a convection-cooled cask is also known, in which a basket with spent fuel is placed in a metal vessel with sealed lids, and the vessel is made with heat-removing side and end ribs, which are both separation and damping elements. The vessel is installed in the cask body to form a gap for air passage, and the ribs of the vessel are in contact with the bottom and side surface of the inner part of the cask. The cask body is formed of outer and inner metal shells, the space between which is filled with radiation-protection material, such as heat-resistant concrete and/or a neutron-absorbing composition. Between the shells, reinforcing heat-removing elements are installed tangentially to the inner shell, made in the form of metal perforated plates, welded to the inner shell and in close contact with the outer shell. In the lower part of the body there are supply cooling channels, and in the lid there are discharge cooling channels. In case of depressurization of the vessel, the cooling channels are closed with plugs (patent RU 2231837, G21F 5/008, 2004).

The disadvantage of this technical solution is that it does not provide for constant monitoring of the condition of the cask sealing and thus does not exclude the possibility of releasing radioactivity into the environment in the event of depressurization of the metal vessel in which the basket with spent nuclear fuel is placed.

The devices for "dry" storage of spent nuclear fuel are known, for example, those described in U.S. Pat. No. 6,802,671, G21F5/10, 1999, No. 8098790, G21C19/06, 2004, in Russian patent No. 2519248, G21F 5/00,2013, in Japanese application No. JP2017129365, G21F1/04; G21F7/00; G21F9/02; G21F9/36, 2016, in PCT application No. WO2018162767, G21F5/008; G21F5/06, 2017.

When packaging spent nuclear fuel from nuclear reactors for dry storage and/or transportation, priority is given to the reliability of storage of radioactive nuclear fuel in order to prevent leakage of radioactive substances into the environment. Reliability is ensured by the tightness of the cask intended for storage, as well as its constant monitoring.

The problem of monitoring the tightness of casks for long-term dry storage of spent nuclear fuel is solved in various ways, which include measuring the parameters of the gas environment (temperature, pressure, composition) either outside the cask or inside.

The most reliable casks are those whose design allows monitoring the condition of tightness by measuring the parameters of the gas environment inside the cask. This approach minimizes the leakage of radioactive material into the environment.

The cask for transportation and/or storage of radioactive materials (U.S. Pat. No. 4,495,139, G21C 17/00, 1985) is known. The known cask includes a tight overlap of the inner cavity of the cask, made in the form of two removable lids installed one above the other and forming sealing contours with the cask body to form three consecutive cavities (monitor chambers). The tightness of the removable lids is ensured by O-rings, which are located in the corresponding grooves of the removable lids. Each of the three monitor chambers respectively communicates with the valve of the tightness monitoring device through a channel in an internal removable lid extending from such chamber. Each valve is installed in a socket that is tightly closed with a corresponding removable additional lid, which, in turn, is tightly closed with a subsequent removable lid.

However, the known device involves relatively high complexity of the monitoring procedure for the tightness of the cask internal cavity, due to the necessity of preliminary removal of the outer tight lid, and then to ensure sequential access to the monitor chambers for the removal of additional lids which respectively shut down the valves for leakage monitoring. In addition, the leakage monitoring when the external removable lid is removed reduces radiation safety.

A cask is known for long-term dry storage of containers with spent nuclear fuel of reactors (Russian utility model patent No. 146031, G21F 5/00, 2014). The known cask contains a body with a lid and a container with spent nuclear fuel placed inside. The cask is equipped with a pressure gauge with a bellows-sealed separator for measuring the pressure of inert gas-helium, pumped into the inner cavity of the spent nuclear fuel container. The bellows-sealed separator is mounted in a cavity made in the lid of the cask on the side of the spent nuclear fuel container, and is connected to a channel made in the upper part of the spent nuclear fuel container. The pressure gauge scale is installed in a through hole in the device cover. In the upper part of the spent nuclear fuel container, a channel is made with a fitting for injecting inert gas-helium into its internal cavity.

The disadvantage of this device is the inability to replace the pressure gauge when it fails or for verification during long-term storage. It is also necessary to install video cameras to record the readings of pressure gauges for a large number of casks in the storage of spent nuclear fuel. The bellows-sealed separator communicates directly with the cavity of the spent nuclear fuel container, which, if the leak is possible, will not protect personnel from radioactive gases during repair work. In the technical solution of the specified utility model, it is proposed, if necessary, to pump inert gas into the inner cavity of the spent nuclear fuel container in the event of pressure drop. Pressure drop in the internal cavity below the threshold values indicates a violation of the tightness of the sealing materials and requires their mandatory replacement, and the procedure for injecting the inert gas will lead to the risk of increased exposure of personnel.

There is a well-known leak-free shutoff device of a cask for transporting and/or storing radioactive materials (Russian patent No. 2464657, G21F 5/00, 2011), mounted using bolted connections in a socket on the outside of the cask. The leak-free shutoff device is made in the form of a movable body and contains a cavity for the test gas and channels for communication with an external device. The proposed technical solution allows you to provide access to the internal environment of the cask without dismantling the sealing elements, as well as to provide the possibility of venting excess pressure from the internal cavity of the cask.

However, the design of the leak-free shutoff device of this cask with a heat-resistant gasket made of rubber or other elastomer does not allow to withstand the temperature conditions of a fire and does not ensure its physical and mechanical properties retention during long-term storage of the spent nuclear fuel cask. Also, the structure of the the leak-free shutoff device communicates directly with the inner cavity of the cask without additional safety barriers, which leads to decrease in radiation safety.

The objective of the invention is to create a method for long-term dry storage of spent nuclear fuel in which the condition of the cask tightness and cask is constantly monitored, at that, the design of the outer cask lid allows monitoring the cask tightness by constantly safely monitoring the pressure of inert gas pumped into the cavity between the two lids of the spent nuclear fuel cask, as well as allows for scheduled maintenance of pressure sensors during long-term storage.

The technical result is to increase the safety of long-term storage of spent nuclear fuel by constantly monitoring the pressure of inert gas injected into the cavity between two lids of the SNF cask, which does not have direct contact with the inner cavity of the cask.

This problem is solved and the technical result is achieved due to the fact that the method of prolonged dry storage of spent nuclear fuel involves the placement of the spent nuclear fuel in the inner cavity of the cask, filling the internal cavity of the cask with inert gas, sealing of the inner cask lid closing the inner cavity with spent nuclear fuel, sealing of the outer cask lid, injecting into the cavity between the outer and inner lids of the cask an inert gas under pressure greater, than the pressure in the inner cavity of the spent nuclear fuel cask, connecting the pressure sensors to the inner side of the outer lid of the cask.

The specified problem is solved and the specified technical result is achieved due to the fact that the spent nuclear fuel cask contains a body with a spent nuclear fuel container placed in it, tight inner and outer lids forming a cavity into which the inert gas is pumped under pressure greater than the pressure in the inner cavity of the cask, while in the outer lid there is a labyrinth hole closed with a flange and sealed with a gasket, an angle valve is installed in the flange, to which at least, two pressure sensors are connected, an angle valve and sensors are covered with a protective cover during long-term storage, in the lower flange of which there is an annular groove in which the gasket is installed.

Additionally, the outer cover has a channel connected to the cavity between the outer and inner lids, sealed with a valve closed by the lid.

During transportation of the cask and during long-term storage of the cask, the valve that shuts down the channel is closed with a blind valve cover.

During the injection of inert gas, the valve that shuts down the channel is closed with a process cover equipped with a rod for controlling the valve and a quick-release coupling for connecting the inert gas injection system and/or a pressure gauge.

The labyrinth hole in the outer lid is sealed with a serrated metal gasket clad on both sides with thermally expanded graphite.

A double serrated metal gasket clad on both sides with thermally expanded graphite is installed in the annular groove.

The protective cover has pressure-tight seals (cable glands) designed for laying cables for a continuous pressure monitoring system. Cable glands are sealed with a ring made of thermally expanded graphite.

Additionally, in the cavity between the two components of the double serrated metal gasket a hole is provided, which is sealed from the outside with a plug with an o-ring made of thermally expanded graphite.

One of the sensors connected to the angle valve is a duplicate.

Pressure sensors are connected to a centralized system of continuous pressure monitoring via cable glands on the protective cover.

The presence of a cavity between the outer and inner lids with an inert gas injected into it under pressure greater than the pressure in the inner cavity of the cask provides additional protection against the release of radioactive gases. Continuous monitoring of the inert gas pressure inside the cavity between the outer and inner lids using sensors installed in the outer lid allows you to determine the change in pressure in the cavity, which will indicate a leakage through the inner lid seals.

The proposed technical solution, using several tightness circuits, provides continuous safe monitoring of the pressure of inert gas injected into the cavity between the two lids of the spent nuclear fuel cask, which does not have direct contact with the inner cavity of the cask.

The presence of a duplicate sensor allows you not to interrupt the pressure monitoring in the event of failure of one of the sensors.

FIG. 1 shows the outer lid in the transport position of the cask.

In the outer lid 1, a labyrinth hole 2 is made, closed by a flange with a plug 3, sealed with a metal gasket 4 and connected to the cavity 5 between the inner and outer lids. A blind valve cover 7 with a metal gasket 4 is installed above the plug 3. Also in the outer lid 1 there is a channel that connects to the cavity 5, sealed with valve 6, which is closed by a blind valve cover 7. In this position of the outer lid, the container is transported.

Figure 2:
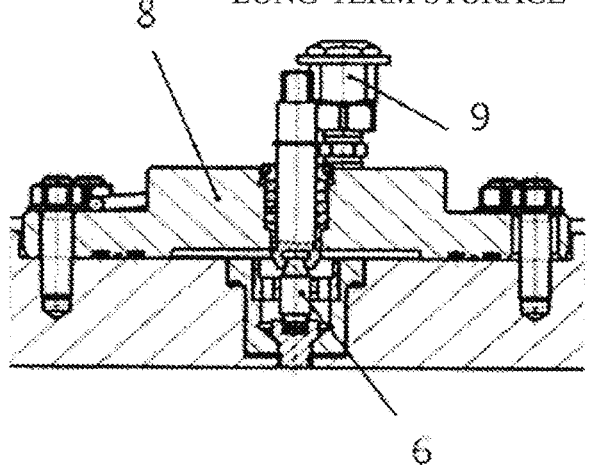

FIG. 2 shows the process cover.

The process cover 8 has a rod for controlling the valve 6 and a quick-release coupling 9 for connecting an inert gas injection system and/or a pressure gauge.

Figure 3:
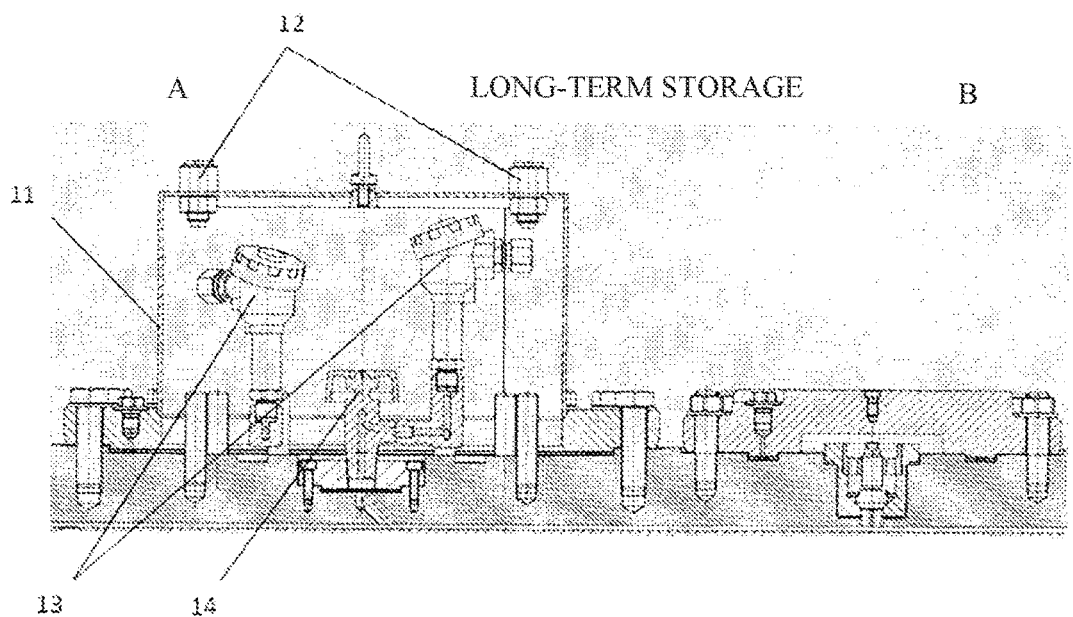

FIG. 3 shows the outer lid in the long-term storage position, in which sensors 13 are connected to the pressure-tight seals (cable glands) 12 from the inside of the protective cover 11.

After vacuum drying of the inner cavity of the spent nuclear fuel cask through the inner lid, according to the requirements, the inner cavity of the spent nuclear fuel cask is filled with inert gas, such as helium, which shall be in the inner cavity during long-term storage of spent nuclear fuel (60 years or more) and the inner lid is sealed. After that, the outer lid of the cask 1 is installed and sealed.

During transportation, the channel is closed with blind valve cover 7.

After delivery of a spent nuclear fuel cask to the storage facility for long-term storage, the following process operations are performed with this cask.

Cover 7 is removed, and instead of it the process cover 8 is installed and sealed (FIG. 2), which has a rod for controlling the valve 6 and a quick-release coupling 9 for connecting the inert gas injection system and/or pressure gauge. To test the tightness of the inner lid of the spent nuclear fuel cask after transportation, to the quick-release coupling 9 a pressure gauge is connected, valve 6 is opened using the rod and the pressure in the cavity between the two lids is measured (if there is a leak in the seals of the inner lid, a pressure gauge will show increased pressure). After checking the tightness of the seals of the inner lid, the pressure gauge is removed and the inert gas injection system is connected in its place through a quick-release coupling 9. Then, the blind cover 7 (FIG. 1) and the plug 3 are removed, and in place of the plug the angle valve 14 is installed (FIG. 3). Two pressure sensors 13 are connected to the angle valve 14 (one—main, the second—backup). The angle valve 14 is closed and the valve 6 is opened through the rod. Inert gas is injected into the cavity 5 through a quick-release coupling 9 and a valve 6 using an inert gas injection system. When the required inert gas pressure is reached in the cavity 5, the valve 6 is closed, the inert gas injection system is turned off, the process cover 8 is dismantled and the blind cover 7 with a serrated metal gasket is installed. After testing the blind cover 7 for tightness, the valve 14 is opened. On the inside of the protective cover 11 (FIG. 3), sensors 13 are connected to the pressure-tight seals 12 (cable glands), after which the protective cover 11 is sealed with a serrated metal gasket and its tightness is checked. From the outside of the protective cover 11, cables of the centralized pressure monitoring system in spent nuclear fuel casks located in the spent nuclear fuel storage are connected to the cable glands 12.

The pressure monitoring system in spent nuclear fuel casks allows continuous monitoring of the pressure in the cavity 5 of each cask installed in the spent nuclear fuel cask storage facility, and the results are read on the storage control panel. When the threshold pressure values in the cavity 5 of a certain cask are reached, an alarm is triggered on the control panel, indicating that the sealing gaskets of a certain spent nuclear fuel cask are broken. The personnel of the storage facility should take actions to eliminate the leakage of a spent nuclear fuel cask.

The use of two pressure sensors on the nuclear spent fuel cask eliminates the risk of false alarms, for example, due to a faulty pressure sensor.

To verify or replace faulty pressure sensors, it is necessary to follow these steps:

Disconnect the cables connected to the cable glands 12 (FIG. 3) on the outside of the protective cover 11 and remove it. Disconnect the cables connected to the cable glands 12 and pressure sensors 13 on the inside of the protective cover 11. Close the angle valve 14 and remove the sensor(s). After replacing the sensors 13, open the angle valve 14, seal the protective cover 11 and connect the pressure monitoring system cables.

The claimed cask design allows for safe long-term dry storage of spent nuclear fuel from VVER-1000/1200 nuclear reactors.

The invention claimed is:

1. A spent nuclear fuel cask containing a body in which a spent nuclear fuel container is placed, comprising:
    sealed inner and outer lids forming a cavity into which the inert gas is pumped under a second pressure greater than a first pressure in the inner cavity of the cask;
    a labyrinth hole closed with a flange and sealed with a gasket in the outer lid;
    an angle valve installed in the flange, to which at least two pressure sensors are connected, the angle valve and the two pressure sensors are covered with a protective cover during long-term storage, wherein the protective cover has pressure-tight seals (cable glands) designed for laying cables for a continuous pressure monitoring system, sealed with a ring made of thermally expanded graphite;
    wherein the gasket is installed in an annular groove in the flange.

2. The cask according to claim 1 characterized in that additionally, the outer cover has a channel connected to the cavity between the outer and inner lids, sealed with a sec on valve closed by the lid.

3. The cask according to claim 2 characterized in that during transportation of the cask and during long-term storage of the cask, the second valve that seals the channel is closed with a blind valve cover.

4. The cask according to claim 2 characterized in that during the injection of inert gas, the second valve that seals the channel is closed with a process cover equipped with a rod for controlling the second valve and a quick-release coupling for connecting the inert gas injection system and/or a pressure gauge.

5. The cask according to claim 1 characterized in that the labyrinth hole in the outer lid is sealed with a serrated metal gasket clad on both sides with thermally expanded graphite.

6. The cask according to claim 1 characterized in that a double serrated metal gasket clad on both sides with thermally expanded graphite is installed in the annular groove.

7. The cask according to claim 1 characterized in that one of the sensors connected to the angle valve is a duplicate.

8. The cask according to claim 1 characterized in that pressure sensors are connected to a centralized system of continuous pressure monitoring via cable glands on the protective cover.

9. A method of prolonged dry storage of spent nuclear fuel including the placement of spent nuclear fuel in the inner cavity of the spent nuclear fuel cask according to claim 1, comprising:
    filling the inner cavity of the cask with the inert gas;
    sealing the inner cask lid;
    closing the inner cavity with the spent nuclear fuel;
    sealing the outer cask lid;
    injecting the inert gas into the cavity between the outer and inner lids of the cask under a second pressure greater than a first pressure in the inner cavity of the spent nuclear fuel cask; and
    connecting the two pressure sensors to the inner side of the outer lid of the cask.

\* \* \* \* \*